(12) United States Patent
Jain et al.

(10) Patent No.: US 10,482,343 B1
(45) Date of Patent: Nov. 19, 2019

(54) GOVERNMENT ID CARD VALIDATION SYSTEMS

(71) Applicant: Capital One Services, LLC, McLean, VA (US)

(72) Inventors: Chintan Jain, Ashburn, VA (US); Ryan Fox, Kings Park, NY (US); Monika Valiramani Boyle, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/553,388

(22) Filed: Aug. 28, 2019

Related U.S. Application Data

(63) Continuation of application No. 16/283,157, filed on Feb. 22, 2019, which is a continuation of application No. 16/150,772, filed on Oct. 3, 2018, now Pat. No. 10,242,283.

(51) Int. Cl.
| | | |
|---|---|---|
| *G06K 9/00* | (2006.01) | |
| *G06K 9/32* | (2006.01) | |
| *G06K 9/62* | (2006.01) | |
| *G06Q 50/26* | (2012.01) | |
| *G06N 3/08* | (2006.01) | |

(52) U.S. Cl.
CPC ......... *G06K 9/3241* (2013.01); *G06K 9/6215* (2013.01); *G06K 9/6256* (2013.01); *G06K 9/6263* (2013.01); *G06N 3/08* (2013.01); *G06Q 50/265* (2013.01)

(58) Field of Classification Search
None
See application file for complete search history.

(56) References Cited

U.S. PATENT DOCUMENTS

| | | |
|---|---|---|
| 8,995,774 B1 | 3/2015 | Deventer et al. |
| 9,438,791 B2 | 9/2016 | Cohen et al. |
| 9,626,556 B2 | 4/2017 | Wang et al. |
| 9,672,510 B2 | 6/2017 | Roach et al. |
| 9,767,354 B2 | 9/2017 | Thompson et al. |
| 2006/0018522 A1 | 1/2006 | Sunzeri et al. |
| 2015/0139506 A1 | 5/2015 | Wang et al. |

*Primary Examiner* — Atiba O Fitzpatrick
(74) *Attorney, Agent, or Firm* — Troutman Sanders LLP; Christopher J. Forstner; John A. Morrissett

(57) ABSTRACT

Systems and methods for pre-validating a digital image of an identification (ID) card (e.g., a government-issued passport, driver's license, etc.) are disclosed. A mobile computing device captures image(s) of an ID card. In response, a pre-validation system in communication with the mobile computing device analyzes one or more quality features of the image(s), which includes determining, utilizing a trained neural network (trained using a dataset including images that have been accepted by a post-validation platform and images that have been rejected by the post-validation platform) and based on the one or more quality features, whether at least a first image of the captured image(s) is usable by a remote post-validation process. Responsive to the determining that the at least a first image is usable, the mobile computing device transmits the first image to a remote server for post-validation of the identification card.

20 Claims, 8 Drawing Sheets

FIG. 1A

GOVERNMENT ID CARD VALIDATION SYSTEMS

CROSS-REFERENCE TO RELATED APPLICATIONS

This application is a continuation of U.S. patent application Ser. No. 16/283,157 filed Feb. 22, 2019, the entire contents of which is incorporated herein by reference in its entirety. U.S. patent application Ser. No. 16/283,157 is a continuation of U.S. patent application Ser. No. 16/150,772, filed Oct. 3, 2018, the entire contents of which is incorporated herein by reference in its entirety.

FIELD

The present disclosure relates to identification (ID) card validation systems and, more specifically, to systems and methods for pre-validating ID card images.

BACKGROUND

Accepting government-issued identification (ID) cards for identity validation is becoming more prevalent as data transfer speeds improve and as mobile cameras become more widely used. A typical modern smartphone, for example, can be utilized to take a clear picture of an ID card with sufficient resolution and clarity for verification of printed security indicia, facial recognition, etc. However, the captured digital image can result in a large file, often ranging in size from 2.5 MB to 10 MB. When such an ID image is uploaded to a verification server, the upload process may be relatively quick (for example, several seconds assuming an upload speed of ~20 Mbps), but the time required by the server's verification software to scan, process, and analyze the millions of pixels to extract important data for verification or rejection can take an additional five to forty seconds. Such a process can be very server intensive and can require huge amount of server CPU and memory.

Certain businesses rely upon digital ID image validation before providing goods and/or services to customers, and it can be detrimental to both the business and customer if it is determined, after taking a digital photo of the ID card and uploading the ID image to a verification server, that the image is unusable (e.g., too blurry, was taken from too far or too close, the subject ID card does not qualify for such a verification process, etc.). ID card validation that utilizes a camera on a user's mobile computing device can be particularly challenging due to various factors such as poor lighting, blurring, incorrect framing, etc.

Accordingly, there is a need for improved systems and methods to address such challenges. Embodiments of the present disclosure are directed to this and other considerations.

BRIEF SUMMARY

Disclosed embodiments provide systems and methods for pre-validating a digital image of an identification (ID) card. Embodiments of the disclosed technology may help avoid inefficiencies and actual costs associated with sending an image to a third-party validation platform when the image will likely be rejected due to poor quality, incorrect framing, blur, missing indicia, wrong type of ID, etc.

Certain example implementations disclosed herein utilize a neural network having a trained model based on a history of acceptances and/or rejections of previously submitted ID images to determine whether the current ID image is likely to be accepted before sending it to the third-party platform for validation. The use of the trained neural network may eliminate the necessity of having insight into the acceptance/rejection criteria, and therefore, may eliminate the necessity for a human to perform pre-validation image analysis.

Consistent with the disclosed embodiments, a computer-implemented method for pre-validation of identification images prior to transfer of the images to a remote server for post-validation is disclosed. The method may include capturing, by a mobile computing device (e.g., a user's smartphone), one or more images of an ID card and analyzing, by a pre-validation system in communication with the mobile computing device, one or more quality features of the one or more images. Analyzing the one or more images may include determining, utilizing a trained neural network and based on the one or more quality features, whether at least a first image of the one or more captured images is usable by a remote post-validation process. The neural network may have been trained using a dataset including images that have been accepted by a post-validation platform and images that have been rejected by the post-validation platform. Responsive to the determining that the at least a first image is usable, the mobile computing device may transmit the first image to a remote server for post-validation of the identification card.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE FIGURES

Reference will now be made to the accompanying figures and flow diagrams, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1A:
FIG. 1A depicts a mobile computing device displaying a captured digital image of the front of an ID card.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

A computer-implemented method is disclosed herein for pre-validation of images prior to transfer of the images to a remote server for post-validation. The method may include capturing, by a mobile computing device, one or more images of an object. The method may also include analyzing, by a pre-validation system in communication with the mobile computing device, one or more quality features of the one or more images. The method may further include determining, utilizing a trained neural network and based on the one or more quality features, whether at least a first image of the one or more captured images is usable by a remote post-validation process. The neural network may have been trained using a dataset including images that have been accepted by a post-validation platform and images that have been rejected by the post-validation platform. Responsive to the determining that the at least a first image is usable, the method may also include transmitting, by the mobile computing device, the first image to a remote server for post-validation of the object. Some embodiments detailed below may refer to an identification card as the captured object, but one of ordinary skill in the art would understand that the disclosed techniques may be applied to a variety of objects, the validity or authenticity of which may be verified or validated remotely based at least in part on the captured image.

A system is disclosed herein for pre-validation of identification images prior to transfer of the images to a remote server for post-validation. The system may include a computing device configured for communication with the remote server, and the computing device includes one or more processors, memory in communication with the one or more processors, an image capture component configured to capture one or more images of an identification card and store the one or more captured images in the memory, a trained neural network in communication with the memory, and instructions stored in the memory that, when executed by the one or more processors, cause the computing device to perform one or more steps of a method. The trained neural network may be configured to analyze one or more quality features of the one or more images. The method may include determining, by the trained neural network, whether at least a first image of the one or more captured images is usable by a remote post-validation process based at least in part on the one or more analyzed quality features. Responsive to determining that the at least a first image is usable, the computing device may transmit the first image to the remote server for post validation of the identification card.

Another system is disclosed herein for pre-validation of identification images prior to transfer of the images to a remote server for post-validation. The system includes a trained neural network configured to analyze one or more quality features associated with one or more images of an identification card, and a computing device in communication with the trained neural network. The neural network may have been trained using a dataset including images that have been accepted by a post-validation platform and images that have been rejected by the post-validation platform. The computing device may include one or more processors, memory in communication with the one or more processors, and instructions stored in the memory that, when executed by the one or more processors, cause the computing device to perform one or more steps of a method. The method may include determining, using the trained neural network, whether at least a first image of the one or more images is usable by a remote post-validation process based at least in part on the one or more analyzed quality features. Using the trained neural network, the system may be further configured to determine whether at least the first image is usable by the remote post-validation process.

Certain example implementations of the disclosed technology may continue to refine the trained neural network as images are evaluated by the post-validation process and accepted or rejected.

In certain example implementations, the identification card (e.g., ID card) can be a government-issued card such as a passport, driver's license, etc. Certain example implementations of the disclosed technology may be utilized to provide pre-validation of a credit card image, a debit card image, a loyalty card image, an access card image, a stored value card image, etc. The disclosed technology can include web-based systems and methods for pre-validating an ID image so that a native application is not required. Embodiments disclosed herein may perform pre-validation checks for issues such as blur, framing, required indicia, appropriate photo, etc., before the image is uploaded to a verification service.

Certain example implementations of the disclosed technology may utilize artificial intelligence (AI) and/or machine learning techniques in which a model is trained to identify criteria for which the image needs to satisfy to pass, so that, for example, an improperly framed or blurry ID card in the image is flagged as problematic before time and resources are wasted uploading the image to the verification server. Certain example implementations of the disclosed technology can provide tangible improvements in the speed and efficiency of the ID verification process.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1A depicts an example scenario in which a digital image 108 of the front of an ID card 106 is captured by a user's mobile computing device 102 (e.g., a camera or image capture component on a user's smartphone, though it is contemplated that another image capture device may capture and transmit an image to the user's smartphone). As illustrated in FIG. 1A, and in certain example embodiments, the ID card 106 may include a photograph 110 of a person. In certain example embodiments, the ID card 106 may include one or more indicia 112 for identifying the person and/or for providing additional information. The one or more indicia 112 may include security features such as holograms, special inks, high-resolution art, barcodes, etc. The one or more indicia 112 may include dates, addresses, names, ID numbers, etc., as further identification and/or security information.

In accordance with certain example implementations of the disclosed technology, the digital image 108 may be captured by the user's mobile computing device 102 with certain imperfections, such as partial rotation 114 with respect to the image frame, which may (or may not) cause the image 108 to be rejected by a verification service. Thus, according to certain example implementations of the disclosed technology, the image 108 may be analyzed by a pre-validation process to provide feedback as to whether the imperfection (e.g., the rotation 114 in the case) would not be acceptable so that the user could re-align the mobile computing device 102 and capture a new image of the front of the ID card 106.

Figure 1B:
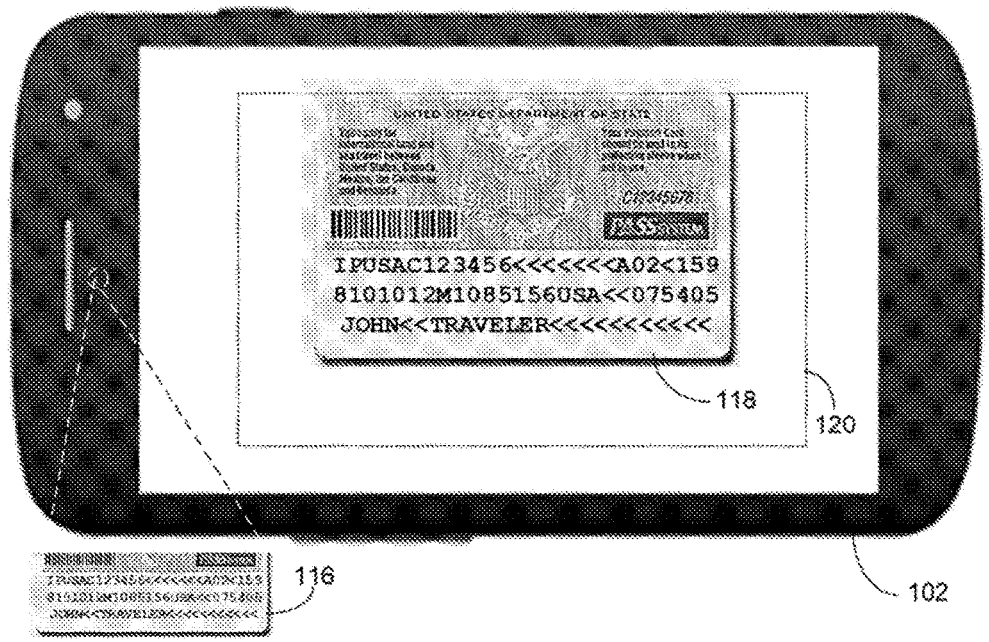
FIG. 1B depicts a mobile computing device displaying a captured digital image of the back of an ID card.

FIG. 1B depicts a similar example scenario as discussed above with respect to FIG. 1A in which a digital image 118 of the back of an ID card 116 is captured by a user's mobile computing device 102. In this illustration, the digital image 118 may be captured by the user's mobile computing device 102 with off-center framing and/or from too far away, which may (or may not) cause the image 118 to be rejected by the verification service. Thus, according to certain example implementations of the disclosed technology, the image 118 may be analyzed by a pre-validation process to provide feedback as to whether the imperfection (i.e., the framing offset and/or fill ratio in the case) would not be acceptable so that the user could capture a new image of the back of the ID card 116. Certain example implementations of the disclosed technology may provide one or more framing guides 120 to aid a user in capturing the ID card image 118. In certain example implementations, the pre-validation service may utilize the trained neural network to determine if the imperfection is acceptable. If the imperfection is determined to be likely problematic for the validation service or a post-validation service, one or more features of the captured image may be analyzed by the pre-validation process to provide feedback for the user for correcting the imperfection.

As may be appreciated, a number of imperfections and/or image quality issues may prevent an ID image from be accepted by the validation service, including but not limited to: blur, framing, rotation, keystone, sharpness, brightness, contrast, color, presence of an image of a human face, and whether the one or more images were captured live by the mobile computing device. Certain example implementations of the disclosed technology may be utilized to detect such imperfections before the ID image is uploaded to the validation service, and to provide feedback so that a user may take appropriate corrective action. In one example scenario, a user may be attempting to have an image of a non-standard ID card validated, and even if the image contains no imperfections or image quality issues, certain example implementations of the disclosed technology may provide rejection and/or feedback information via the pre-validation process so that repeated attempts at validation with the unacceptable or wrong type of ID card image can be avoided.

Figure 2A:
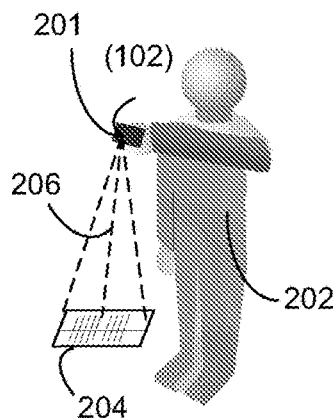
FIG. 2A depicts a perspective view of a user capturing an image of an ID card with an image capture device, in accordance with some embodiments.
Figure 2B:
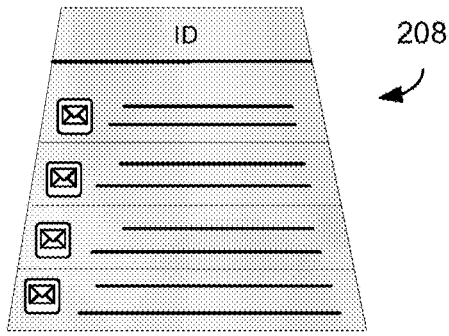
FIG. 2B depicts a captured digital image of an ID card in which the image capture device was angled upwardly relative to the plane of the ID card.
Figure 2C:
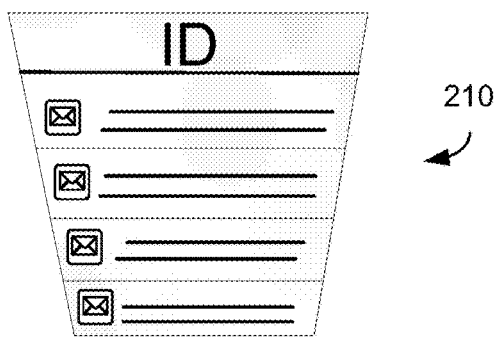
FIG. 2C depicts a captured digital image of an ID card in which the image capture device was angled downwardly relative to the plane of the ID card.

FIG. 2A depicts a user 202 capturing an image of an ID card 204 with a digital camera 201 of a mobile computing device 102, though it is contemplated that any type of image capture device may be used including an image capture device connected to a computer (e.g. a laptop or desktop). The user may attempt to capture the image at an appropriate distance 206 between the ID card and the camera 201 so that the resulting image may have extents of the ID card portion properly framed relative to extents of the full image. For example, the validation service may require that extents of the ID card portion should take up at least a given fill ratio or percentage (such as 50%) of the area of the full image without any cropping. The user may attempt to capture the image while the camera 201 is not moving, for example, so that the resulting image does not include excessive blurring. However, it is likely that the user 202 will capture the image while the camera 201 is moving, when the camera 201 is not focused on the ID card 204, when the distance 206 is too great or too small (resulting in improper framing ratio), when the camera zoom is improperly set, when the camera 201 is angled, etc. For example, FIG. 2B depicts a captured digital image 208 of an ID card in which the camera 201 was angled upwards relative to the plane of the ID card causing keystone in the image 208. FIG. 2C depicts a captured digital image 210 of an ID card in which the camera 201 was angled downwards relative to the plane of the ID card causing keystone in the image 210. As will be discussed below with reference to FIG. 6 and FIG. 7, certain example implementations of the disclosed technology may be utilized to determine acceptable keystone parameters of an image. In certain example implementations, certain keystone or other issues (such as rotation, framing, contrast, brightness, etc.,) in the ID card image may be automatically corrected prior to uploading the ID card image to the third-party validation service.

In certain example implementations, the mobile computing device may include one or more sensors including but not limited to a focus detector, contrast detector, phase detector, and/or laser detector that may be utilized to determine the distance 206 between the camera 201 and the ID card 204. In certain example implementations, the determined distance 206 combined with zoom settings and/or effective focal length of the camera 201 may be utilized as an indication of proper framing of the ID card relative to the extents of the full image.

According to an example implementation of the disclosed technology, the fill ratio (i.e., the extents of the ID card portion divided by the extents of the full image) may be determined via image processing, as will be discussed below with reference to FIG. 4.

Figure 3:
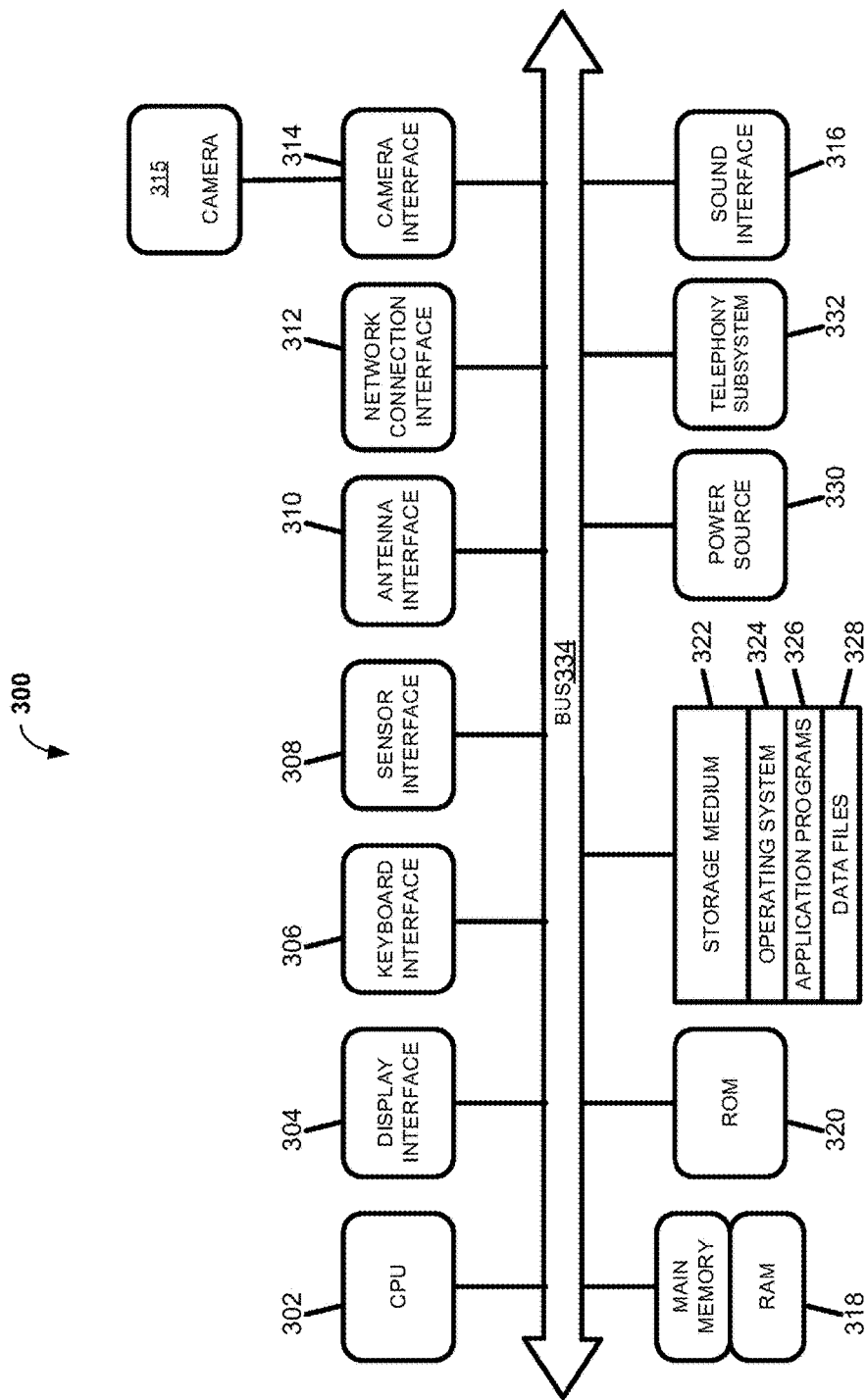
FIG. 3 is a block diagram of a computing device, according to an example implementation of the disclosed technology.

FIG. 3 depicts a block diagram of an illustrative computing device 300 according to an example implementation. Certain aspects of FIG. 3 may be embodied and/or reside in the mobile computing device 102. Certain example implementations of the disclosed technology may be embodied and/or reside at a pre-validation web server, as will be discussed with respect to FIG. 4 below. According to one example implementation, the term "computing device," as used herein, may include a CPU, or conceptualized as a CPU (for example, the CPU 302 of FIG. 3). In this example implementation, the computing device (CPU) may be coupled, connected, and/or in communication with a network via communication channels including, but not limited to Internet connections, satellite communications, wireless channels, cloud connections, etc.

In an example implementation, the computing device may output content to its local display and may transmit and receive messages via the antenna interface 310, the network connection interface 312, telephony subsystem 332, etc. The computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing module (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (e.g., data and/or image information) for an external/remote display or mobile computing device that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

The network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general-purpose input and output (GPIO) port, a game port, a universal serial bus (USB), a micro-USB port, a high definition multimedia (HDMI) port, a video port, an audio port, a Bluetooth® port, a near-field communication (NFC) port, another like communication interface, or any combination thereof.

The computing device 300 may include a keyboard interface 306 that provides a communication interface to a keyboard. In one example implementation, the computing device 300 may include a pointing device interface 308 for connecting to a presence-sensitive input interface. The pointing device interface 308 may provide a communication interface to various devices such as video cameras, ingress/egress sensors, etc.

The computing device 300 may be configured to use an input device via one or more of input/output interfaces (e.g., the keyboard interface 306, the display interface 304, the pointing device interface 308, the antenna interface 310, the network connection interface 312, camera interface 314, sound interface 316, etc.) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be one or more of: an accelerometer, a magnetometer, a digital camera, a microphone, and an optical sensor.

Certain example implementations of the computing device 300 may include an antenna interface 310 in communication with an antenna. The antenna interface 310 can include one or more of: a receiver, analog-to-digital converter, sampler, buffers, and memory. Certain example implementations can include a network connection interface 312 that provides a communication interface to a network.

In certain implementations, a camera interface 314 may act as a communication interface to provide functions for capturing digital images (and/or video) from a camera. In certain example implementations, the camera interface 314 may be utilized to control certain characteristics of the camera, such as focus, aperture, exposure time, burst rate, etc.

In certain implementations, a sound interface 316 may serve as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g., such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored.

In accordance with certain example implementations of the disclosed technology, the application programs 326 can include special-purpose software that may process image data.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing module. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive modules, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing module (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

The features and other aspects and principles of the disclosed embodiments may be implemented in various environments. Such environments and related applications may be specifically constructed for performing the various processes and operations of the disclosed embodiments or they may include a special-purpose computer or computing platform selectively activated or reconfigured by program code to provide the necessary functionality. Further, the processes disclosed herein may be implemented by a suitable combination of hardware, software, and/or firmware. For example, the disclosed embodiments may implement computing machines configured to execute software programs that perform processes consistent with the disclosed embodiments. Certain disclosed embodiments may implement a specialized apparatus or system configured to execute software programs that perform processes consistent with the disclosed embodiments. Furthermore, although some disclosed embodiments may be implemented by general-purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code. For example, the disclosed embodiments may execute high-level and/or low-level software instructions, such as machine code (e.g., such as that produced by a compiler) and/or high-level code that can be executed by a processor using an interpreter.

Figure 4:
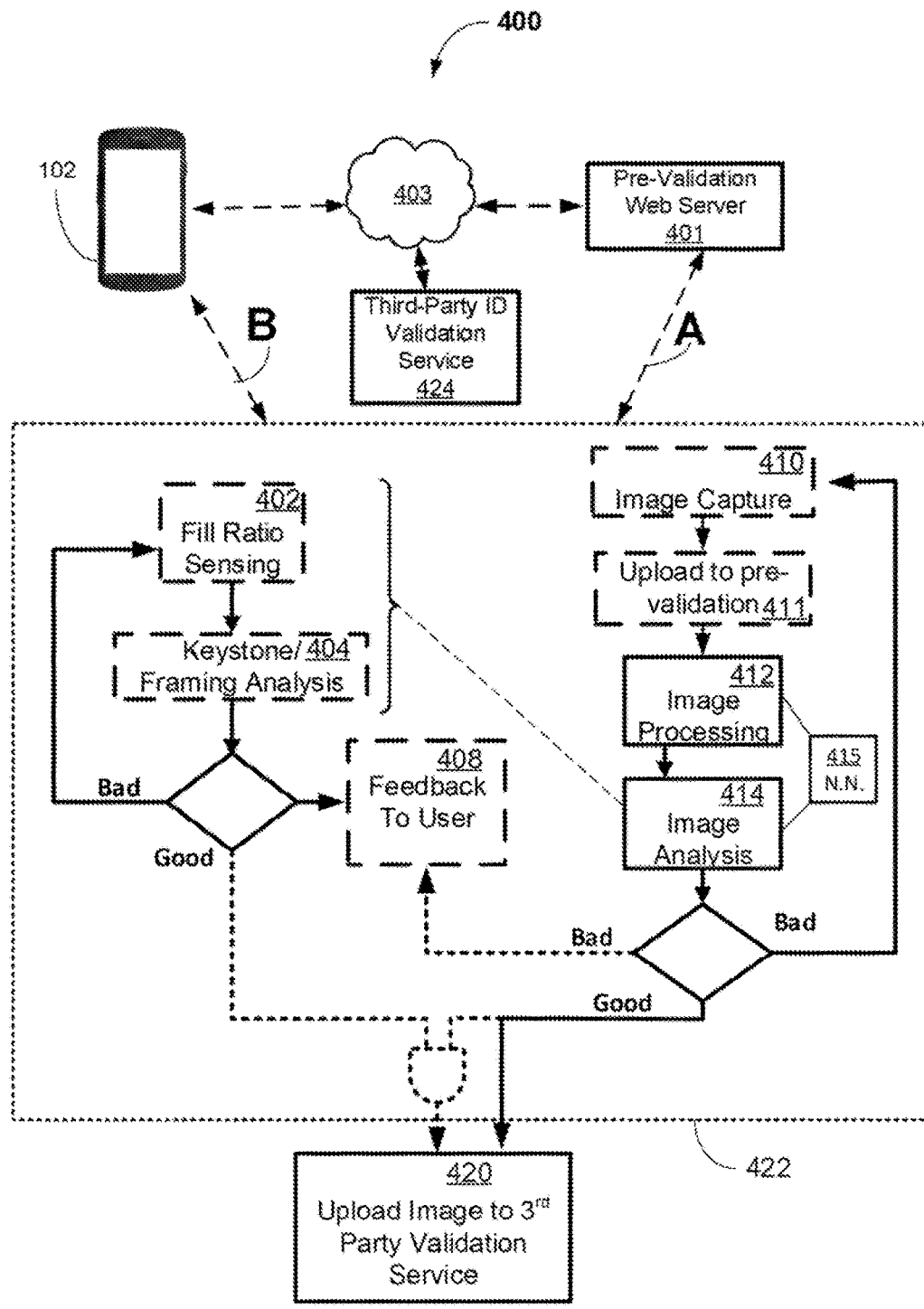
FIG. 4 depicts an exemplary process diagram for pre-validating an ID image prior to uploading the image to a third-party validation service, according to an example implementation of the disclosed technology.

FIG. 4 depicts an example system and process 400 for pre-validation of an ID image prior to uploading the image to a third-party validation service 424, according to an example implementation of the disclosed technology. In one example variant (as indicated by the designation "A"), one or more of the pre-validation steps 422 (with the exception of the image capture 410 and upload 411) may be handled by a pre-validation web server 401 in communication with the mobile computing device 102 via a network 403, which may include a local area network and/or a wide area network, such as the Internet. In this A-variant, the mobile computing device 102 may not require native image pre-validation analysis/processing software. In certain example implementations, the mobile computing device 102 may include standard image capturing and browser software (and/or APIs and/or plug-ins) that can capture an image 410, access the pre-validation web server 401 via a webpage, for example, and upload 411 the digital image to the pre-validation web server 401, while the image processing 412 and analysis 414 may be handled by the remote pre-validation web server 401.

With continued reference to the A-variant, the mobile computing device may access the pre-validation web server 401 via a web interface, which may control the mobile computing device's 102 image capture 410 and upload 411 process. Certain example implementations of the disclosed technology may only accept uploaded images that were captured "live" by the mobile computing device 102 and not derived from a previously stored file, which may have been edited. In certain example implementations, timestamps may be utilized to distinguish live captured ID images.

Once a captured ID image is uploaded to the pre-validation web server 401, special image processing 412 and/or image analysis 414 modules and/or software in communication with a trained neural network 415 may process and analyze the uploaded ID image. The neural network 415 may include a trained model based on a history of acceptances and/or rejections of previously submitted ID images to determine whether the current ID image is likely to be accepted before sending it to the third-party ID validation service 424 or platform.

In certain example implementations, the trained neural network 415 utilized in the image processing 412 module and/or the image analysis 414 module may include "neurons" organized into layers: input, hidden and output. The input layer may include values that are inputs to the next layer of hidden neurons. Several hidden layers can exist in one neural network. The final layer may be the output layer. In certain example implementations, the output layer may include a node for each evaluated aspect of the image. In certain example implementations of the disclosed technology, a sweep forward through the network may result in an assignment of a value to each output node. In certain example implementations, the input image may be accepted or rejected based on the values of the output nodes.

In the training phase, the correct class (for example, the ID card type and/or country of issuance) for each expected ID card may be known via supervised training, and the output nodes can be assigned correct values, such as "1" for the node corresponding to the correct class, and "0" for the others. Certain example implementations of the disclosed technology may compare the network's calculated values for the output nodes to the correct values to calculate an error term for each node. The error terms may be utilized to adjust the weights in the hidden layers so that, during the next iteration the output values will be closer to the correct values.

One feature of neural network 415, as disclosed herein, is an iterative learning process that may be utilized for training. For example, training images of ID cards may be presented to the network one at a time, and the weights associated with the input values may be adjusted. After all training images are presented, the process may be repeated to refine the neural network training. In one example implementation of the disclosed technology, and during this learning phase, the network may be trained by adjusting the weights to predict the correct classification label of input images. Advantages of neural networks include their high tolerance to noisy data, as well as their ability to classify patterns on which they have not been trained.

In certain example implementations, the neural network 415 may process the training images one at a time, using the weights and functions in the hidden layers. The resulting outputs may then be compared against the desired outputs. In certain example implementations, errors may be propagated back through the network to adjust the weights for application to the next training image. During the training of a network, the same set of training data may be processed many times as the connection weights are continually refined. In certain example implementations, a recursive neural network may be utilized during training and/or during the pre-validation process. For example, a recursive neural network may utilize classification information from a set of ID card images to adjust classification for a single ID card image.

Certain example implementations of the disclosed technology may utilize a neural network 415 that is pre-trained for particular subsets of ID card images, such as driver licenses for each state in the United States, for example. Once the neural network 415 has been trained, it may receive one or more image frames of an ID card as input. The neural network 415 may process the input image and assign value to each output node. The input image frame may be assigned to a classification with the highest value and/or best match to a particular trained object, such as a particular state, type of ID, etc.

According to an example implementation of the disclosed technology, the neural network 415 may be trained to provide node output values corresponding to one or more quality features such as: fill ratio, blur, framing, rotation, keystone, sharpness, brightness, contrast, color, presence of an image of a human face, indicia, etc.

In certain example implementations, the pre-validation web server 401 may also perform additional tasks, such as fill ratio sensing 402, framing analysis 404, blur analysis, keystone analysis, human face detection, associated corrections, etc., on the uploaded ID image. However, in certain embodiments, such tasks may be unnecessary to perform, particularly if the image processing 412 and/or image analysis 414 steps in conjunction with the trained neural network 415 can determine that the raw uploaded ID image is acceptable (i.e., good). As indicated in FIG. 4, if the uploaded ID image is determined to be acceptable, the image may be uploaded 420 to the third-party validation service for the ultimate determination ID image acceptability.

In accordance with certain example implementations of the disclosed technology, if the pre-validation web server 401 determines that captured and uploaded ID image is unacceptable (e.g., bad), one or more of the above-referenced tasks may be performed to provide feedback 408 to the user for suggested corrective action, such as re-positioning the camera of the mobile computing device 102 relative to the ID card. For example, and as will be discussed below with reference to FIG. 5A, FIG. 5B, FIG. 6, and FIG. 7, certain example implementations of the disclosed technology may perform image analysis 414 that can determine the fill ratio 402, keystone, and/or framing 404, etc., for providing feedback 408 to the user.

With continued reference to FIG. 4, and in another example variant (as indicated by the designation "B"), one or more of the pre-validation steps 422 (as described above) may be processed by the mobile computing device 102 using a special purpose native application having a trained neural network 415 (and other features described above), and without requiring upload to the pre-validation web server 401.

In another example variant "AB", certain pre-validation steps 422 (such as image capture 410 and fill ratio sensing 402) may be processed by the mobile computing device 102, while other steps (such as image processing 412 and image analysis 414) may be processed by the pre-validation web server 401.

Figure 5A:
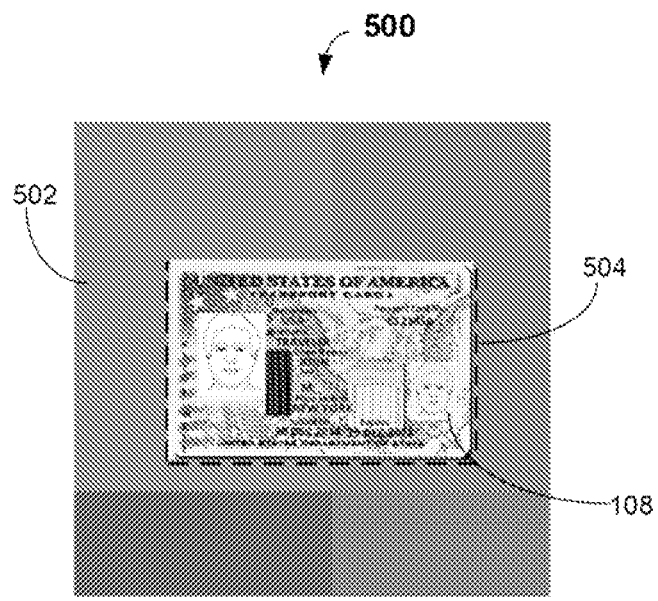
FIG. 5A illustrates an exemplary screenshot of a captured image of the front of an ID card having proper framing.
Figure 5B:
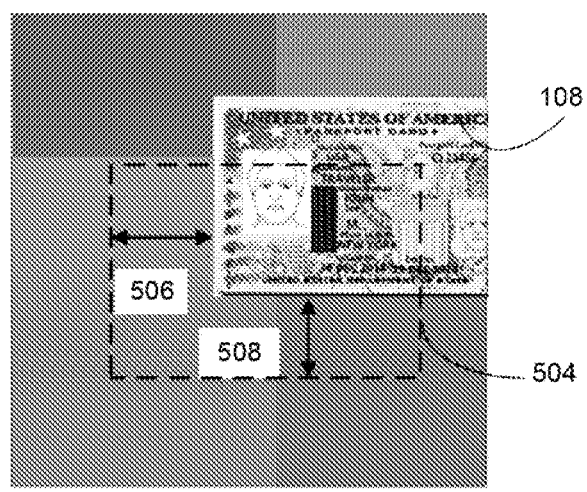
FIG. 5B illustrates an exemplary screenshot of a captured image of the front of an ID card having improper framing.

FIG. 5A illustrates a captured image 502 of the front of an ID card 108 having example proper framing. In certain example implementations, the extents of the ID card 108 may be compared with a predefined central region 504 to determine if the framing is proper. FIG. 5B illustrates a captured image of the front of an ID card 108 having framing that may cause the image to be rejected by a validation service. In certain example implementations, one or more of a horizontal offset 506 and a vertical offset 508 with respect to the predefined central region 504 may be determined when the pre-validation fails, for example, to provide some type of feedback to the user for correcting the improper framing. In accordance with certain example implementations of the disclosed technology, the check for proper framing may be performed prior to upload to the pre-validation service.

Figure 6:
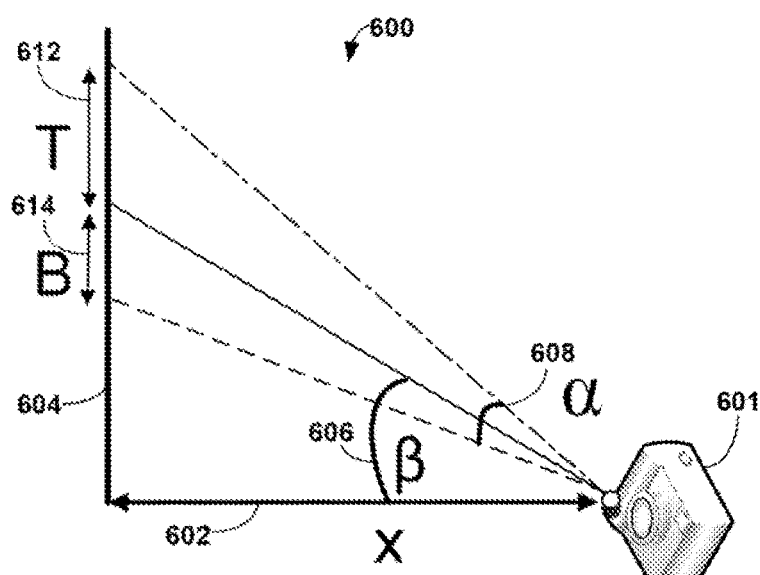
FIG. 6 depicts a diagram for capturing images of an ID card with an image capture device, in accordance with some embodiments.

FIG. 6 illustrates an example setup 600 for capturing images of an ID card using a camera 601 (which in certain implementations may be integrated into the mobile computing device 102, as depicted in FIG. 1). The camera 601 may be separated from the plane 604 of the ID card 610 by at least a distance x 602. In an example scenario, the camera 601 may be tilted with respect to the normal of the plane 604 of the ID card by a tilt angle β 606. In an example implementation, the extents of the ID card (top portion T 612 plus the ID card bottom portion B 614) together with the tilt angle β 606 and distance x 602 may define the ID card image acceptance angle α 608. According to an example implementation, a captured image of the ID card may have a top half span T 612 which may differ from the captured image bottom half span B 614 as a function of the tilt angle 606. For example, a length of the captured image ID card top half span T 612 may be calculated as follows:

$$T = x[\tan(\beta+\alpha/2) - \tan \beta].$$

The length of captured image ID card bottom half span B 614 may be calculated as follows:

$$B = x[\tan \beta - \tan(\beta-\alpha/2)].$$

In an example implementation, the ratio of T 612 to B 614 may be utilized to determine if the ID card image is usable. According to another example implementation of the disclosed technology, trapezoidal distortion due to the tilt angle β 606 with respect to the plane of the ID card 604 may be determined based on the ratio of T 612 to B 614 and may be used to correct keystone in the captured image.

Figure 7:
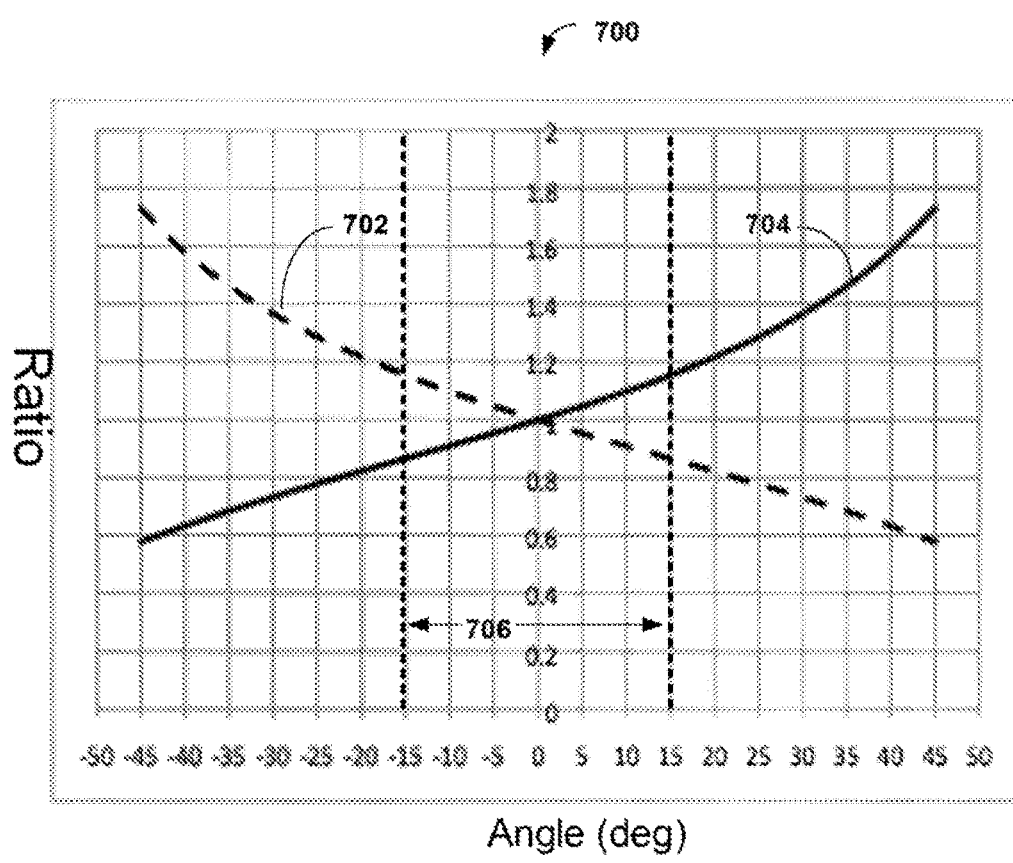
FIG. 7 is a graph illustrating the effects of keystone in an image and an example acceptable range.

FIG. 7 is a graph 700 illustrating the effects of keystone in an image and an example acceptable range 706. FIG. 7 also depicts a curve 704 of the ratio T/B as a function of the tilt angle β 606. Also depicted in FIG. 7 is an example correction factor curve 702 (B/T) as a function of the tilt angle β 606 that may be applied to the image, for example to compensate for trapezoidal distortion. According to an example implementation, the tilt angle (i.e., the tilt angle β 606 in FIG. 6) may be utilized to determine the correction factor 702 if the full acceptance angle (for example, the ID card image acceptance angle α 608) is known.

Figure 8:
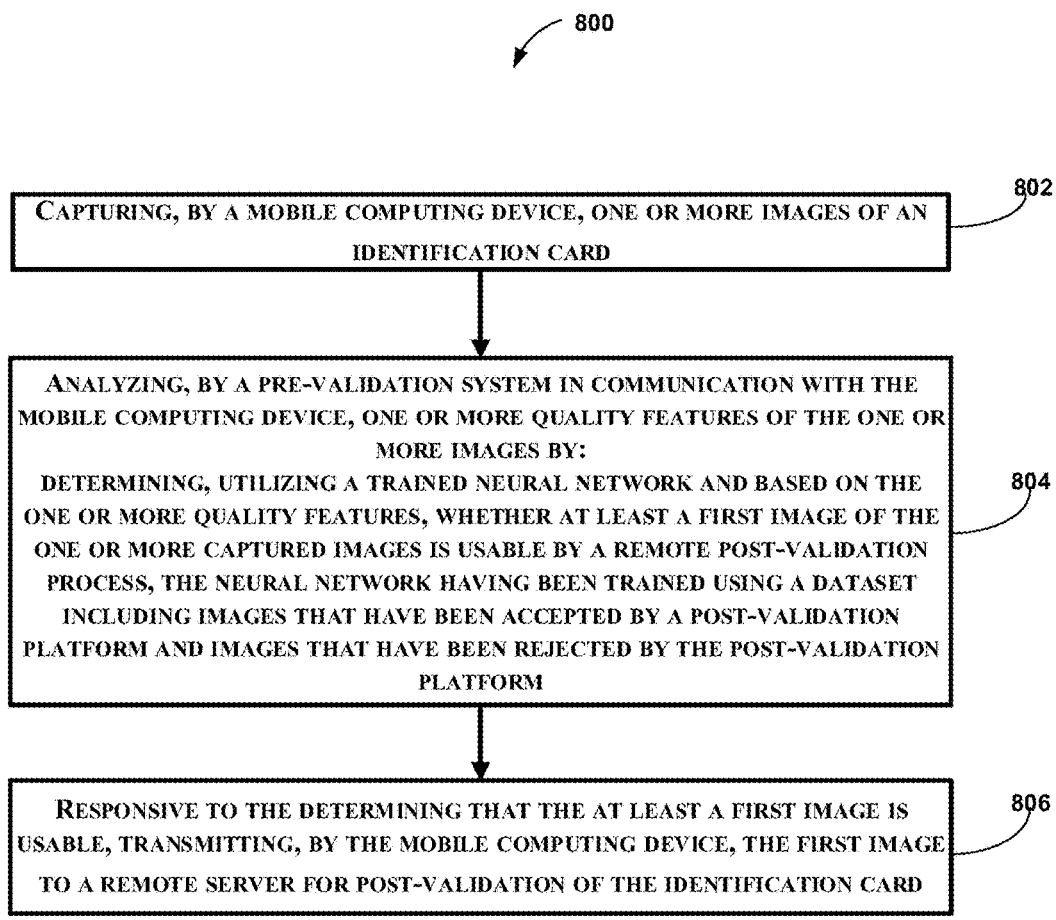
FIG. 8 is a flow diagram of a method for validating one or more images of an ID card, according to an example implementation of the disclosed technology.

FIG. 8 is a flow diagram of a method 800 according to an example implementation of the disclosed technology. In block 802, the method 800 includes capturing, by a mobile computing device, one or more images of an identification card. In block 804, the method 800 includes analyzing, by a pre-validation system in communication with the mobile computing device, one or more quality features of the one or more images, wherein the analyzing includes determining, utilizing a trained neural network and based on the one or more quality features, whether at least a first image of the one or more captured images is usable by a remote post-validation process, the neural network having been trained using a dataset including images that have been accepted by a post-validation platform and images that have been rejected by the post-validation platform. In block 806, the method 800 includes, transmitting, by the mobile computing device, the first image to a remote server for post-validation of the identification card responsive to the determining that the at least a first image is usable.

Figure 9:
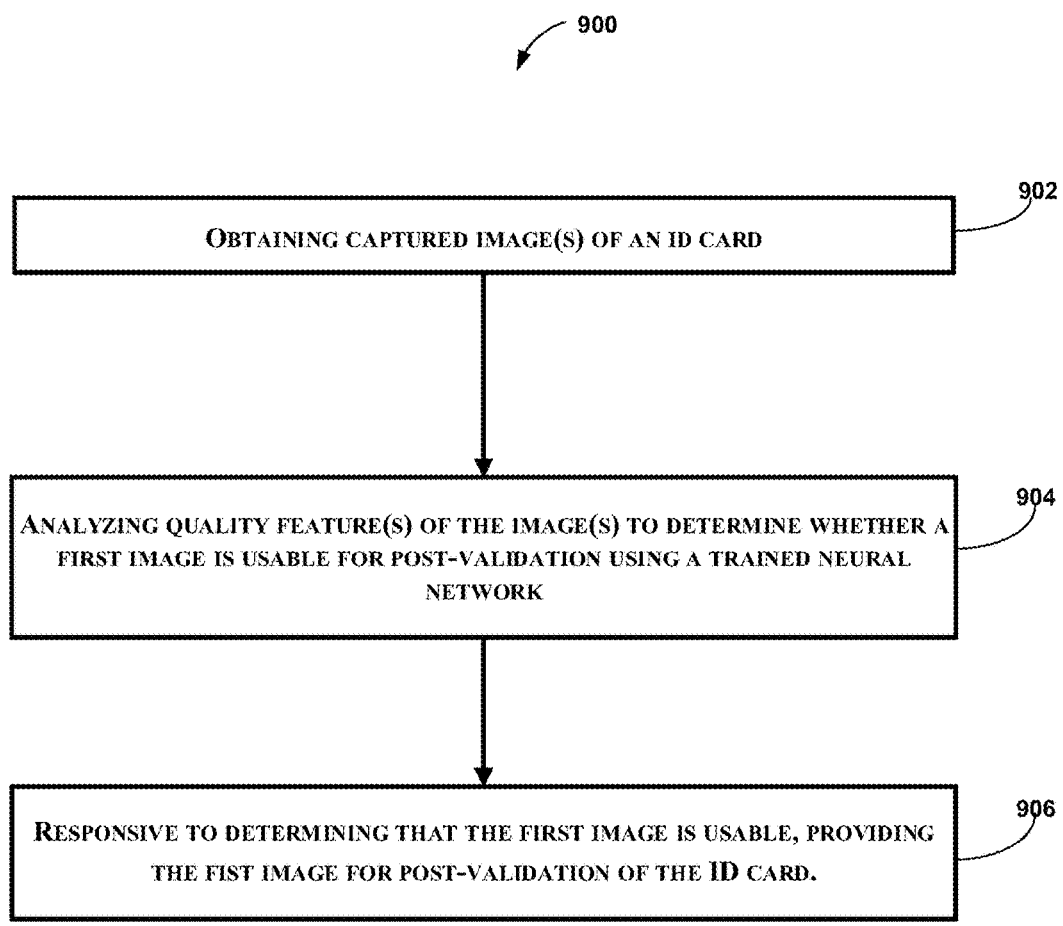
FIG. 9 is a flow diagram of another method for validating one or more images of an ID card, according to an example implementation of the disclosed technology.

FIG. 9 is a flow diagram of a method 900 according to an example implementation of the disclosed technology. In block 902, the method 900 includes obtaining captured image(s) of an ID card. In block 904, the method 900 includes analyzing quality feature(s) of the image(s) to determine whether a first image is usable for post-validation using a trained neural network. In block 906, the method 900 includes providing the first image for post-validation of the ID card responsive to determining that the first image is usable.

In certain example implementations, analyzing the one or more quality features of the one or more images can include determining a ratio of a size of the captured one or more images of the identification card to a full size of the captured image.

In certain example implementations, the identification card may be one or more of: a government-issued identification card, a credit card, a debit card, a loyalty card, an access card, and a stored value card.

In certain example implementations, analyzing the one or more quality features of the one or more images can include determining a distance between the mobile computing device and the identification card during capture of the one or more images. In certain example implementations, the mobile computing device is configured to utilize information from one or more of: a contrast detector, a phase detector, and a laser detector to determine the distance.

Certain example implementations of the disclosed technology can include outputting, to a display of the mobile computing device, feedback information related to the one or more analyzed quality features.

In accordance with certain example implementations of the disclosed technology, the one or more quality features can include one or more of: fill ratio, blur, framing, rotation, keystone, sharpness, brightness, contrast, color, presence of an image of a human face, and whether the one or more images were captured live by the mobile computing device.

In an example implementation, determining whether at least a first image of the one or more captured images is usable by the remote post-validation process can include analyzing the first image for the presence of one or more indicia.

In certain example implementations, the mobile computing device may be in communication with the pre-validation system via a web application.

The systems and methods disclosed herein may take advantage of modern computer architecture for significant improvements in object recognition. As used in this application, the terms "component," "module," "system," "server," "processor," "memory," and the like are intended to include one or more computer-related modules, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

Throughout the specification, the use of the term "exemplary" is intended to mean "example" and does not mean "best" or "preferred."

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

In the exemplary use cases described below, a user may wish to submit a digital photo of an ID card (or other identifying physical object in their possession) to a third-party validation service for authentication, access, or any purpose for which possession of identification is requested or required. To improve the chances that the digital photo will be accepted by the third-party validation service, and to avoid expenses, time, and/or bandwidth associated with uploading an image of a non-valid, blurry, or otherwise problematic ID image, a pre-validation service may be utilized first to quickly determine the likelihood that the image will be accepted by the third-party validation service.

In a first use case, a camera (e.g., digital camera 201) of a mobile computing device (e.g., mobile computing device 102) or a webcam of a laptop or desktop may be utilized to capture one or more digital photographs of an ID card (e.g., as shown in FIGS. 1A-1B). Other image capture devices may be utilized to capture and/or upload the captured digital photograph to a computer. The image capturing process may be under at least partial control and/or in communication with a web app that is hosted by a remote pre-validation web server (e.g., pre-validation web server 401), for example, so that the web app may verify that the captured image was taken "live" and not retrieved from a file that was previously taken and stored for more than a predetermined period. In this use case, (as designated by "A" in FIG. 4) the mobile computing device (or other image capture device) may be utilized to capture the image, upload the image to the pre-validation server, and receive/display any useful feedback (including an indication of acceptability or rejection of the image), while the bulk of the image analysis (including image evaluation with the neural network) may be done by the remote pre-validation web server. The pre-validation server (e.g., pre-validation web server 401) may be configured to directly submit a pre-validated (acceptable) image of the ID card to the third-party ID validation service (e.g., third-party ID validation server 424) for ultimate validation without requiring the user to re-upload the image. In this use case, it may not be necessary for any native pre-validation application(s) to reside on the mobile computing device since the communication with the pre-validation web server can be accomplished through a web browser.

In a second use case, (and as designated by "B" in FIG. 4), the mobile computing device (e.g., mobile computing device 102) may include a mobile app capable of performing part or all of the image pre-validation. In this use case, the mobile computing device may be utilized to capture the image, perform image analysis using a resident trained neural network, and upload a pre-validated (acceptable) image of the ID card to the third-party ID validation service (e.g., third-party ID validation server 424) for ultimate validation.

In this use case, the mobile computing device may include an image processing (e.g., image processing app 412) and/or image analysis (e.g., image analysis app 414) app having a machine vision model capable of distinguishing certain objects among a plurality of objects. In certain example implementations, the image processing/analysis app may be an executable software program configured to process captured images of an object of interest and classify/evaluate the input images based on matching features with the pre-trained model. According to an example implementation of the disclosed technology, the model may use about 20 to 50 Mbytes of memory on the mobile computing device. In certain example implementations, machine vision model may use about 50-500 Mbytes of memory on the mobile computing device. In this use case, the user may download the image processing and/or image analysis app having a machine vision model and/or trained machine vision model data and/or related information specific to a specific type of ID. This use case may leverage video/image capturing capabilities of a mobile computing device, while providing one or more pre-trained machine vision models and neural network classification software that may be stored locally on the mobile computing device. Certain example implementations of the disclosed technology enable image capturing, classification, and recognition output to be performed on the mobile computing device.

The invention claimed is:

1. A computer-implemented method for pre-validation of identification images, the method comprising:
    capturing, by an image capturing device of a mobile computing device, one or more images of an identification card;
    analyzing, by a processor of the mobile computing device, one or more quality features of the one or more images, wherein the analyzing comprises:
        determining, utilizing an application having a trained neural network and based on the one or more quality features, whether at least a first image of the one or more captured images is unusable by a remote post-validation platform, the neural network having been trained using a dataset including images that have been rejected by the post-validation platform; and
    responsive to the determining that the at least a first image is unusable, outputting by the mobile computing device, feedback instructions to capture one or more new images for determining whether the one or more new images are unusable by the post-validation platform.

2. The method of claim 1, wherein the application is a native application configured to execute on the mobile computing device, the native application comprising a pre-trained machine vision model configured to process the one or more captured images.

3. The method of claim 2, wherein the pre-trained machine vision model is configured to evaluate one or more features of the one or more captured images based on pre-trained features of the model.

4. The method of claim 2, wherein the pre-trained machine vision model occupies less than 50 Mbytes of memory on the mobile computing device.

5. The method of claim 1, further comprising: determining, utilizing the application, whether at least the first image of the one or more captured images is usable by the remote post-validation platform.

6. The method of claim 1, wherein the identification card comprises one or more of: a government-issued identification card, a credit card, a debit card, a loyalty card, an access card, and a stored value card.

7. The method of claim 1, further comprising outputting, to a display of the mobile computing device, image capture framing feedback information related to the one or more analyzed quality features.

8. The method of claim 1, wherein the one or more quality features comprise one or more of: fill ratio, blur, framing, rotation, keystone, sharpness, brightness, contrast, color, presence of an image of a human face, and whether the one or more images were captured live by the mobile computing device.

9. The method of claim 1, wherein determining whether at least a first image of the one or more captured images is unusable by the remote post-validation platform further comprises analyzing the first image for a presence of one or more indicia.

10. A system, comprising:
    one or more processors;
    a memory in communication with the one or more processors;
    an image capture component;
    a trained neural network model stored in the memory and configured to analyze one or more quality features associated with one or more images of an identification card captured by the image capture component and stored in the memory, the neural network model having been trained using a dataset including images that have been rejected by a post-validation platform; and
    instructions stored in the memory that, when executed by the one or more processors, cause the one or more processors to determine, using the trained neural network model, whether at least a first image of the one or more images is unusable by the post-validation platform based at least in part on one or more analyzed quality features of the first image.

11. The system of claim 10, wherein the one or more quality features comprise one or more of: distance between an object and the image capture component, fill ratio, blur, framing, rotation, keystone, sharpness, brightness, contrast, and color.

12. The system of claim 10, wherein the one or more quality features comprise a presence of an image of a human face on the identification card.

13. The system of claim 10, wherein the one or more quality features comprise an indication that the one or more images were captured by the image capture component.

14. The system of claim 10, wherein the one or more processors are configured to determine a distance between the image capture component and an identification card.

15. The system of claim 10, wherein the trained neural network model occupies less than 500 Mbytes of the memory.

16. The system of claim 10, wherein the trained neural network model is configured to determine whether at least the first image of the one or more captured images is usable by the post-validation platform.

17. The system of claim 10, wherein the identification card comprises one or more of: a government-issued identification card, a credit card, a debit card, a loyalty card, an access card, and a stored value card.

18. A non-transitory computer-readable media comprising computer-executable instructions that, when executed by one or more processors, configure the one or more processors to perform a method of:

capturing, by an image capturing device, one or more images of an identification card;

analyzing, by the one or more processors, one or more quality features of the one or more images, wherein the analyzing comprises:

determining, utilizing an application having a trained neural network and based on the one or more quality features, whether at least a first image of the one or more captured images is unusable by a remote post-validation platform, the neural network having been trained using a dataset including images that have been rejected by the post-validation platform; and responsive to the determining that the at least a first image is unusable, outputting feedback instructions to capture one or more new images for determining whether the one or more new images are unusable by the post-validation platform.

19. The non-transitory computer-readable media of claim 18, wherein the application comprises a pre-trained machine vision model configured to process the one or more captured images.

20. The non-transitory computer-readable media of claim 19, wherein the pre-trained machine vision model is configured to evaluate the one or more quality features of the one or more captured images based on pre-trained features of the model.

* * * * *